J. N. VAN METER.
DRAIN COCK.
APPLICATION FILED OCT. 31, 1917.
1,296,239.
Patented Mar. 4, 1919.
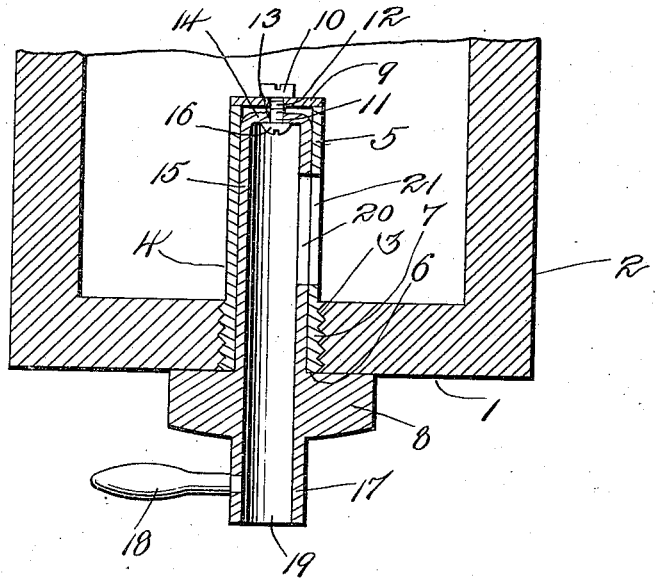
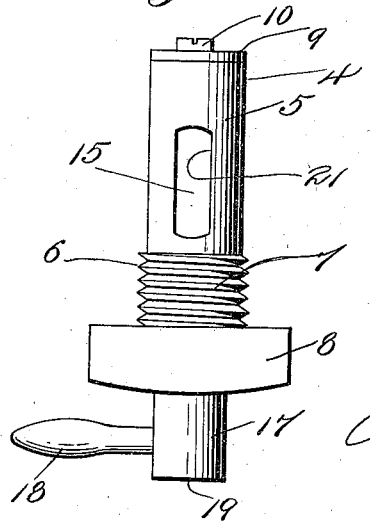

UNITED STATES PATENT OFFICE.

JOHN N. VAN METER, OF NORTON, KANSAS, ASSIGNOR OF ONE-THIRD TO FRED S. HAZELTON AND ONE-THIRD TO FRANK W. KIDDER, BOTH OF NORTON COUNTY, KANSAS.

DRAIN-COCK.

1,296,239.　　Specification of Letters Patent.　　Patented Mar. 4, 1919.

Application filed October 31, 1917.　Serial No. 199,426.

*To all whom it may concern:*

Be it known that I, JOHN N. VAN METER, a citizen of the United States, residing at Norton, in the county of Norton and State of Kansas, have invented certain new and useful Improvements in Drain-Cocks, of which the following is a specification.

This invention relates to an improved drain cock and has for its object to provide a drain cock for any liquid retainer and especially adapted for automobile radiators so constructed that water is at no time sealed or held in the cock.

Another object of the invention is to provide a drain cock having a vertical tubular passage with its lower end open in order that water can not be held in the passage.

Another object of the invention is to provide a drain cock having a vertical passage protruding into a liquid retainer with the aperture emersed sufficiently to prevent ice or sediment from clogging said drain opening.

With the above and other objects in view I have invented the device illustrated in the accompanying drawings in which, Figure 1 is a vertical sectional view of my drain cock shown attached to a liquid container, and shown open, and Fig. 2 is an elevational view of the cock shown closed.

Like reference characters indicate like parts throughout the following specification and in the views in the drawings, in which 1 indicates the bottom wall of a radiator or other vessel 2 having a threaded aperture 3 into which is screwed a drain cock 4 which consists of an outer tubular member 5 having its lower end 6 threaded as at 7 and integrally secured to the nut head whereby it may be screwed into place in the opening 3. The upper end of tube 5 is closed by a wall 9 through which a screw or nut 10 having a shank 11 extends, said shank having a tight closure for the opening 12 through which it passes, and also extends through an opening 13 in the upper wall 14 of the inner tube 15 which is rotatable upon said shank and held thereto by the head 16. The outer cylindrical walls of tube 15 functionally engage the inner cylindrical walls of the outer tube 5 and head 8 entirely through which the inner tube extends and projects below said head 8 a sufficient distance as at 17 to accommodate the handle 18 whereby it is rotated. The lower end 19 of tube 15 is open and said tube has an opening 20 in its upper side wall which, in one position (see Fig. 1) alines with an opening 21 in the upper side wall of the outer tube 5. By operating handle 18 tube 15 may be rotated so as to move openings 20 and 21 out of alinement, thus closing the cock, (see Fig. 2). Whether open or closed no water can remain in the cock, thus the common difficulty of having the water which usually stands in the cock freeze and thereby prevent drawing off of water in the radiator or liquid container is obviated.

Having now described my invention that which I claim as new and desire to procure by Letters Patent is:—

The combination with a liquid container, of a drain cock including a tubular casing extending through the bottom of the container and closed at its upper end, the lower end of said casing being flush with the bottom of the container and there being an outlet opening in the casing close to the bottom of the container, an inner tube or valve fitted for rotation in the outer tube or casing and closed at its upper end, the lower end of the valve extending below the outer tube or casing and having an enlarged angular or nut portion, said valve having a bore of uniform diameter extending to the lower or outlet end thereof, a screw detachably connected to the upper ends of the casing and of the inner tube or valve for adjustably connecting the upper ends of the casing and valve to hold the nut portion pressed flat against the bottom of the container, and a handle connected to the lower portion of the inner tube or valve, said valve having an opening in the wall thereof movable into and out of register with the opening in the casing.

In testimony whereof I affix my signature in the presence of two witnesses.

JOHN N. VAN METER.

Witnesses:
F. M. LOCKARD,
F. S. HAZELTON.

Copies of this patent may be obtained for five cents each, by addressing the "Commissioner of Patents, Washington, D. C."